United States Patent
Fischer

[15] 3,664,227
[45] May 23, 1972

[54] PRESSURE-OPERATED DEVICE FOR CLAMPING OF WORKPIECES ON GEAR PROCESSING MACHINES

[72] Inventor: Heinrich R. Fischer, Munich, Germany

[73] Assignee: Carl Harth, Maschinen-und Zahnradfabrik, Munich, Germany

[22] Filed: July 22, 1969

[21] Appl. No.: 843,650

[30] Foreign Application Priority Data

July 30, 1968 Germany .................... P 17 52 877.7

[52] U.S. Cl. ....................................90/1, 90/11 A, 279/51
[51] Int. Cl. .......................................................B23f 23/06
[58] Field of Search .................90/1, 88, 11 A, 11 R; 82/44; 279/51, 52, 53, 1 E; 269/49

[56] References Cited

UNITED STATES PATENTS

| | | | |
|---|---|---|---|
| 3,397,615 | 8/1968 | Meinke | 90/11 A |
| 2,113,124 | 4/1938 | Zimmermann | 90/1 X |
| 3,474,705 | 10/1969 | Jacob, Jr. | 90/11 A |

FOREIGN PATENTS OR APPLICATIONS

| | | | |
|---|---|---|---|
| 21,719 | 8/1961 | Germany | 90/1 |

Primary Examiner—Gil Weidenfeld
Attorney—Woodhams, Blanchard and Flynn

[57] ABSTRACT

A device for clamping workpieces on gear processing machines in which a drawbar is driven axially to pull to workpiece onto a workpiece support. A resilient collet is secured to a drawbar and has an outer cone for engaging a draw-in arbor to permit the drawbar to apply an initial pressure on the workpiece when the drawbar is pulled toward a workpiece support. The collet is received by a countercone which resiliently yields to the pull of the drawbar to permit the drawbar to apply a final clamping pressure to the workpiece.

12 Claims, 5 Drawing Figures

PRESSURE-OPERATED DEVICE FOR CLAMPING OF WORKPIECES ON GEAR PROCESSING MACHINES

The invention relates to a pressure-operated device for the clamping of workpieces into gear processing machines in which the workpiece is located on a workpiece support by an axially drivable drawbar and the workpiece is thereby centered.

It is also known to have workpieces having a central bore clamped between a rotatably drivable rotary table and a clamping member on gear processing machines, namely, with a drawbar which is connectible to the tailstock spindle sleeve through an expandable sleeve by means of a clamping piston having conical surfaces, the sleeve being expandable against the force of a spring (U.S. Pat. No. 3 200 711).

The conical surface on the clamping piston which effects an expanding of the sleeve so that its cylindrical outer surface is urged against a cylindrical inner surface, requires a sharply tapered draw-in arbor. However, very often workpieces with a small opening therein are to be clamped by a relatively large pressure. If one would taper the draw-in arbor according to the earlier teaching for forming a clamping piston, then the remaining cross section would not be sufficient for the required clamping pressure.

The purpose of the invention is to produce a pressure-operated clamping device of the above-discussed type which is suitable for workpieces having a relatively small center bore.

The basic purpose of the invention is attained by a presently known collet, which is closable against a spring tension and has an outer conical surface for clamping a draw-in arbor for pressing either the workpiece or a workpiece engaging clamp, which collet is received in a conically shaped opening which can be urged resiliently in direction of the drawbar pull. The invention does not depend on the direction in which the drawbar acts. Thus the workpiece can, for example, be pulled onto the workpiece support on the workpiece spindle or the like or also onto a countersupport in a direction which is either downwardly, upwardly or to the side.

If the draw-in arbor or the workpiece does not allow any adjustment, the invention is further constructed so that the draw-in arbor or the workpiece are forceably clamped by the collet.

If, however, on the other hand, the friction in the frictional connection is not sufficient for the clamping force, the invention is further constructed so that the draw-in arbor may be provided with a shoulder or a notch or the like so that same is positively clamped by the collet. It is an advantage of the invention, that the positive locking can be effected by a very small shoulder of, for example, approximately a few tenths of a millimeter, which shoulder thus does not appreciably weaken the draw-in arbor or the workpiece.

Furthermore, a construction of the subject matter of the invention is advantageous in which the draw-in arbor is secured to a presently known countersupport.

Advantageous for centering the workpiece in the device of the invention is the construction of a resilient centering device which is supported in the collet.

Furthermore, depending on the use, two further constructions of the invention are advantageous, namely, one being that the collet is positively connected to the drawbar in both directions of movement, and the other one being that a collet having some axial movement is connected to the drawbar.

Further advantages and characteristics of the invention will be described in the following description.

The invention is discussed in connection with some exemplary embodiments which are illustrated in FIGS. 1 to 5.

Figure 1:
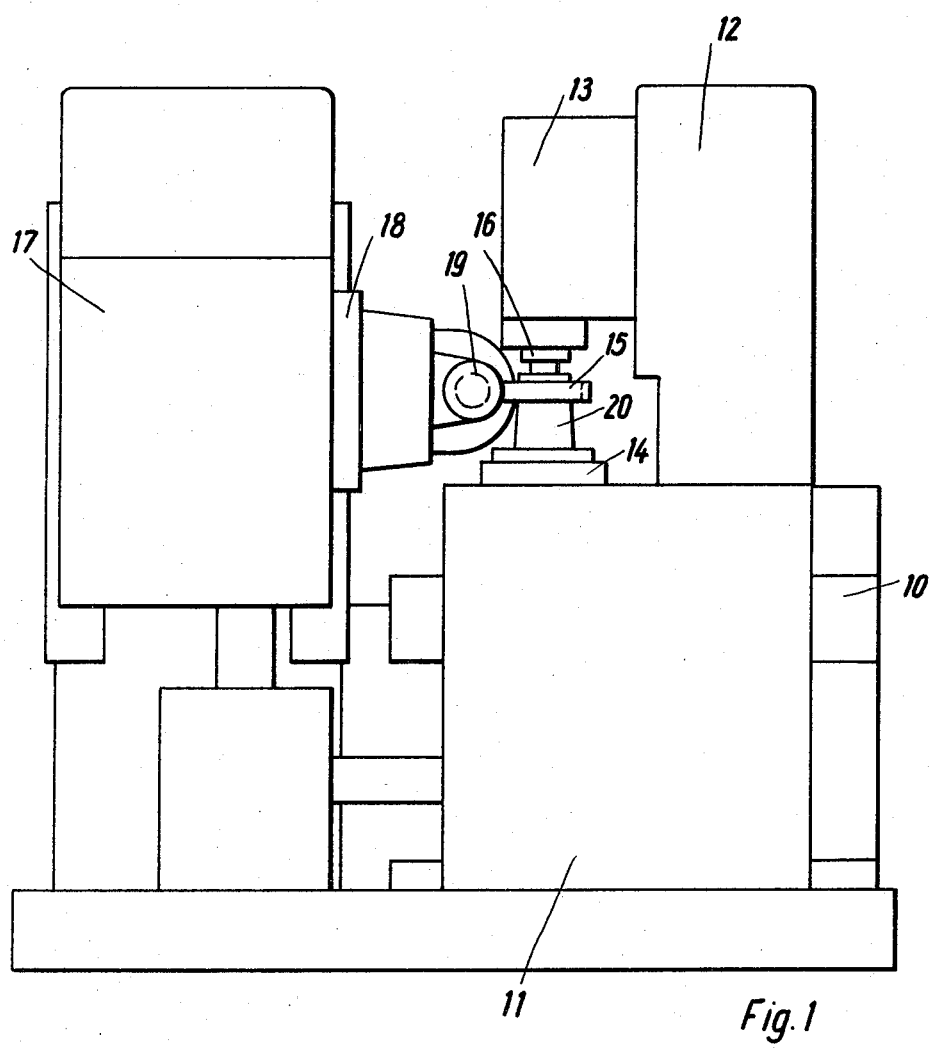
FIG. 1 illustrates a gear generating machine on which the invention can, for example, be utilized.

FIG. 1 is illustrative of a gear generating machine for making gears on which the invention can be utilized. The invention can also be used on other types of generating machines. A workpiece carriage 11 is supported drivably, movably and, if necessary, securably on a machine frame 10. A support 12 is secured to the workpiece carriage and supports a tailstock 13. Said tailstock is supported for such movement, driving or securement with respect to the support 12 as desired. Furthermore, a workpiece spindle is supported drivably and rotatably in a known manner in the workpiece carriage. The spindle of the headstock is identified at 14. A workpiece 15 is clamped between said spindle and the tailstock. The tailstock has for this purpose in the exemplary embodiment a rotatable spindle sleeve 16 and the headstock spindle is provided with a workpiece support 20 which will be referred to hereinafter as a bell 20. Furthermore, a worktool carriage 17 is supported movably and drivably in a known manner on the machine frame. The worktool carriage is provided with a swingable worktool holder 18. Said holder supports in a known manner a worktool 19 which, in the illustrated embodiment, is a hob.

The above-described machine is known. The workpiece spindle 14 is, for example, provided with a hydraulic clamping device which is also known and is therefore not illustrated in detail.

A draw-in arbor 21 (FIG. 2) is screwed to the spindle sleeve 16. Furthermore, a clamp 23 is secured to a flange 22 of the draw-in arbor (as shown) or directly to the draw-in arbor. The clamp serves the purpose of pressing the workpiece 15 onto a support 24 which is screwed to the top side of the bell 20. The support 24 is provided with a downwardly resilient ejector member 25 which, driven by springs 26, ejects the workpiece upwardly after the pressure of the clamp 23 has been removed. The upward stroke of the ejector is limited by abutment bolts 27. The bell 20 is secured to the headstock 14 by screws 40 and is secured by suitable means, for example, a block 41, against rotation relative to the headstock. The aforementioned draw-in arbor centers according to the invention the workpiece in an opening 28 therethrough and is used at the same time as a tensioning means in the manner described hereinafter.

Figure 2:
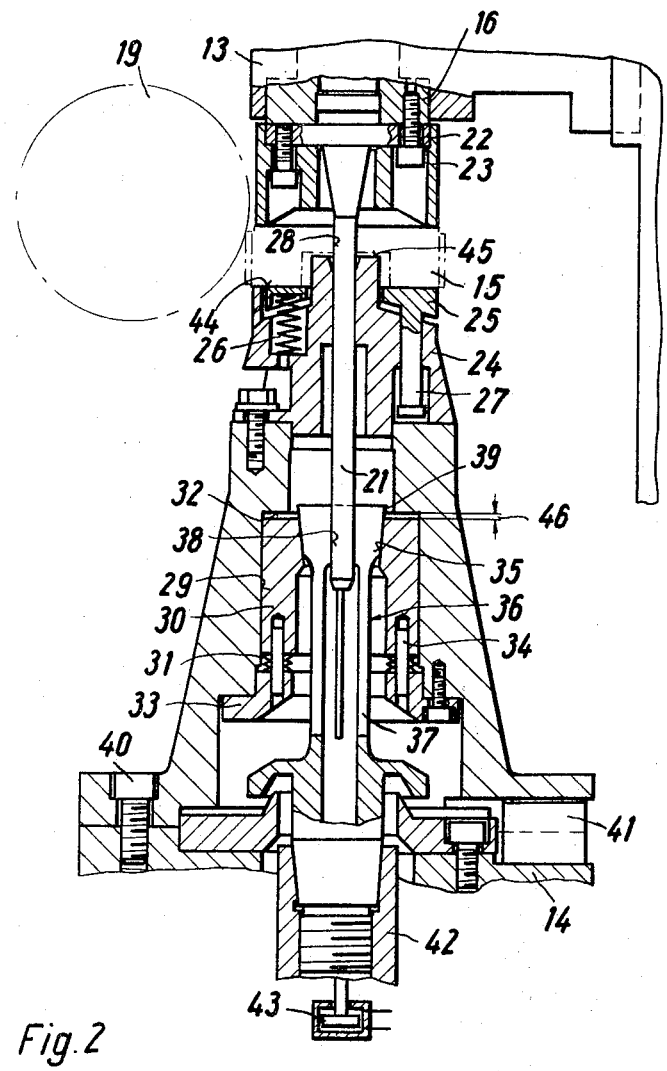
FIG. 2 illustrates schematically in a cross-sectional view one exemplary embodiment of the invention.

A receiving ring 30 is movably guided, according to the invention, in an internal recess 29 in the bell 20. The receiving ring 30 is pressed upwardly against a shoulder 32 (FIG. 3) by springs 31. The springs 31 are supported on a flange 33 which is secured to the bell 20 by screws (FIG. 2). The receiving ring 30 is secured against rotation by pins 34. The receiving ring 30 is provided with a conically shaped central opening 35 which enlarges in an upward direction. A collet 36 which, in a known manner, is provided with slots 37 so that the receiving bore 38 of the collet can be expanded resiliently, is arranged concentrically to the receiving ring 30 or to the headstock 14. The collet 36 is provided at its upper end with a conical surface 39 which fits into the aforementioned conically shaped central opening 35. The collet 36 is threadedly engaged with a drawbar 42 which, in a known manner, can be moved axially by a clamping device, for example, a hydraulic clamping piston. The hydraulic clamping piston is illustrated schematically in FIG. 2 in a reduced scale and is identified at 43.

Figure 3:
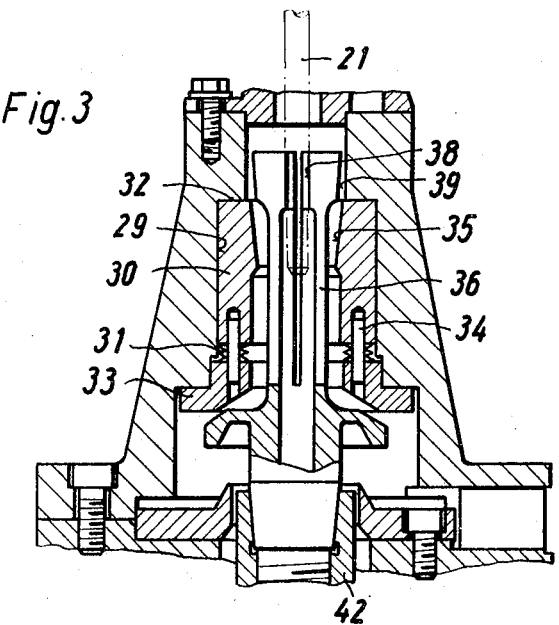
FIG. 3 is an enlarged fragmentary view of the device of FIG. 2 but with the parts in a different working position.

Before a workpiece is clamped, the tailstock 13 and the draw-in arbor 21 are moved upwardly. The collet 36 is raised, as illustrated in FIG. 3. The receiving ring 30 engages the shoulder 32 under the pressure of the springs 31. The upper edge 44 of the ejector 25 is positioned approximately at the height of the upper edge 45 of the support. Before clamping, the workpiece is placed on the upper edges 44, 45 of the ejector 25; the tailstock 13 is then lowered until the draw-in arbor 21 extends into the receiving bore 38 of the collet (dotted lines in FIG. 3). The workpiece is thereby positioned as approximately illustrated in FIG. 2. The clamping piston 43 is then moved downwardly. The bore 38 in the collet 36 slides over the outer surface of the arbor 21 first without a clamping friction contact but with sufficient friction to pull preferably the tailstock 13 or the clamp 23 onto the workpiece 15 to clamp the workpiece 15 onto the support with a relatively small pressure. When the conical surface 39 engages the conically shaped opening 35, upon a further pulling of the drawbar 42, the upper end of the collet 36 is compressed to engage the outer surface of the arbor 21 and the receiving ring 30 is urged resiliently downwardly. A space 46 is formed thereby between the receiving ring 30 and the shoulder 32. A very tight clamping is achieved hereby according to the invention whereby the clamping is not done by a pressure applied to the tailstock, which would result in a jamming of the tailstock, but the clamping is caused by pulling the tailstock 13 toward the workpiece spindle 14. This results in a good connection between the workpiece carriage 11, the support 12, the tailstock 13, the workpiece 15, the bell 20 and the workpiece spindle 14. This good connection is achieved according to the invention by a pure frictional connection between the draw-in arbor 21 and collet 36. Through this it is possible, even in the case of a small bore 28 in the workpiece, to exert or to transmit a large clamping pressure through the draw-in arbor which, according to the invention, centers the workpiece at the same time.

Figure 4:
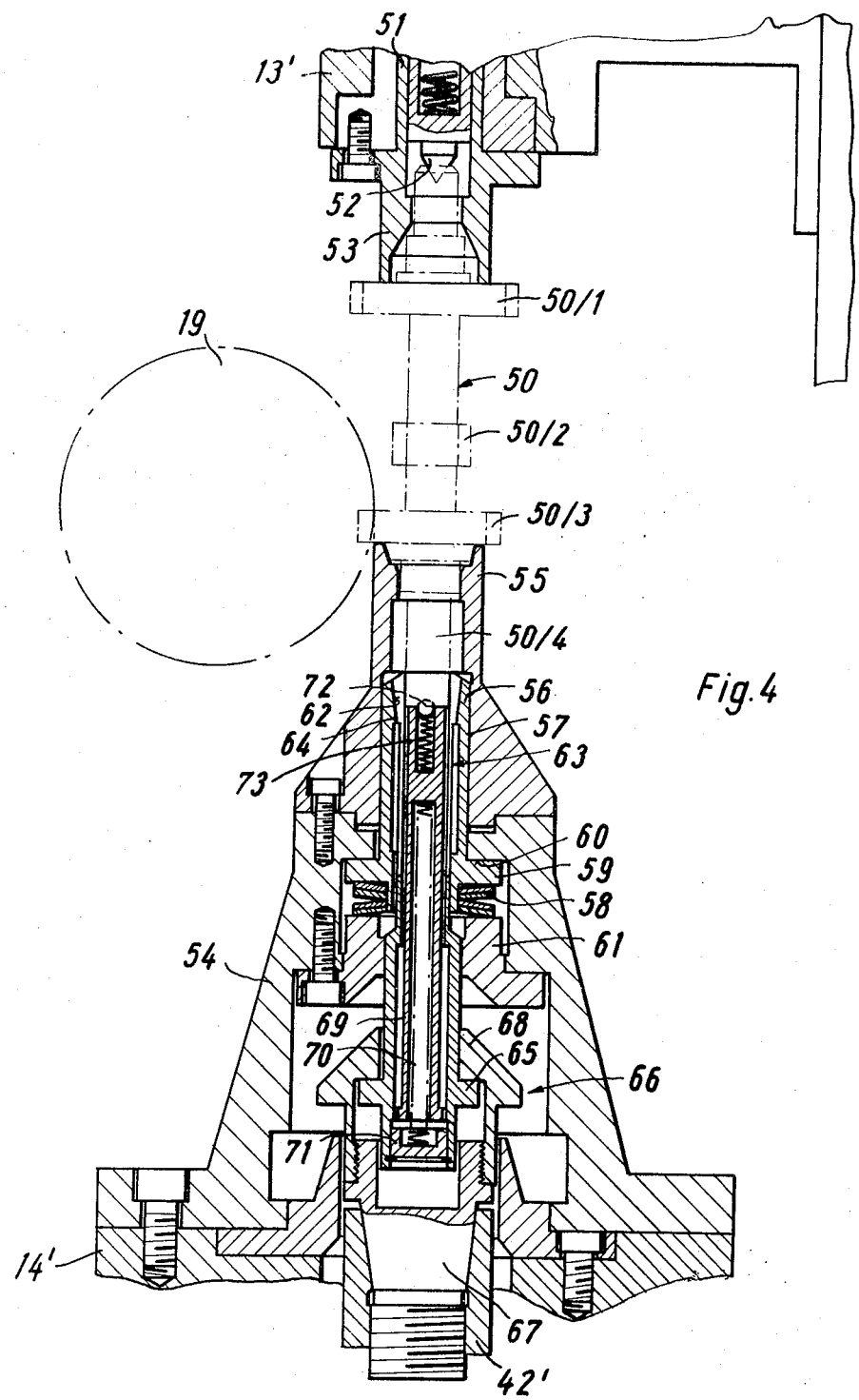
FIG. 4 illustrates another exemplary embodiment of the invention.

FIG. 4 illustrates an exemplary embodiment in which the tailstock 13' is not pulled to the workpiece support but, instead, the workpiece is, according to the invention, pulled onto the workpiece support, whereby the tailstock 13' is used as a support. The workpiece 50 is, for example, a gear block, namely a shaft with several ring gears 50/1, 50/2, 50/3. The workpiece 50 can, if desired, appear differently than the chosen example. The workpiece is centered in the tailstock spindle sleeve 51 with a known resilient footstock center. For pressing the workpiece against the hereinafter-described workpiece support, a clamp 53 is used which is screwed to the spindle sleeve. Again a bell 54 is used as the workpiece support, said bell being screwed onto the headstock 14' and fixed against rotation relative to said headstock 14' by suitable means. A support 55 which is adjusted to the workpiece is mounted on the bell 54, the workpiece extending into said support with a smooth pin 50/4.

The support 55 has a cylindrical guide opening 56 which receives a sleeve 57 which is guided for longitudinal movement. The sleeve 57 is urged toward the tailstock 13' by means of springs 58. The sleeve 57 is supported by means of a flange 59 engaging a suitable shoulder 60 in the bell 54. A support flange 61 is secured to the bell 54 and is used as an abutment for the springs 58. The sleeve 57 can be urged resiliently downwardly. The sleeve 57 is provided with a conically shaped opening 62 at its upper end. A collet 63 is guided for longitudinal movement in the sleeve 57 or in the flange 59 or in another suitable part. The collet 63 is provided with an outer conical surface 64 at its upper end, said outer conical surface fitting into the conically shaped opening 62. The collet 63 is, as aforedescribed, slotted at the upper end so that it can expand and contract resiliently. The collet 63 is provided with a flange 65 at its lower end, which flange is inserted in a recess in a connecting piece 66. The connecting piece 66 is, for reasons of installation, composed of two parts, namely of a connecting cone 67 and a clamping nut 68. The flange 65 of the collet 63 is positioned according to the invention between these two parts with clearance enough to move slightly axially. The connecting cone is threadedly engaged with the drawbar 42' of the clamping device.

A resilient centering piece is provided in the collet 63. This centering piece can be a resilient footstock center or a centering bolt 69 which is urged toward the workpiece by means of a spring 70 which is supported on the collet 63 by means of a stopping member 71. At the end of the workpiece 50 the centering bolt is provided with a centering ball 72 which is urged toward the workpiece 50 by means of a spring 73. The ball is secured against removal by any suitable means.

The operation of the device corresponds to the one of the earlier exemplary embodiment in such a manner that the connection between the workpiece 50 and the bell 54 or the workpiece spindle 14' is positive, whereby the frictional connection is reinforced according to the invention during the pulling of the drawbar 42' through the interconnected conical surfaces 62, 64. It is important for the invention that the sleeve 57 can be urged resiliently downwardly. Differing from the earlier embodiment, the drawbar 42' does not pull the tailstock 13' downwardly through a draw-in arbor but pulls the workpiece onto its support. An advantage which is decisive for the invention is that the workpiece does not require a shoulder for clamping.

Figure 5:
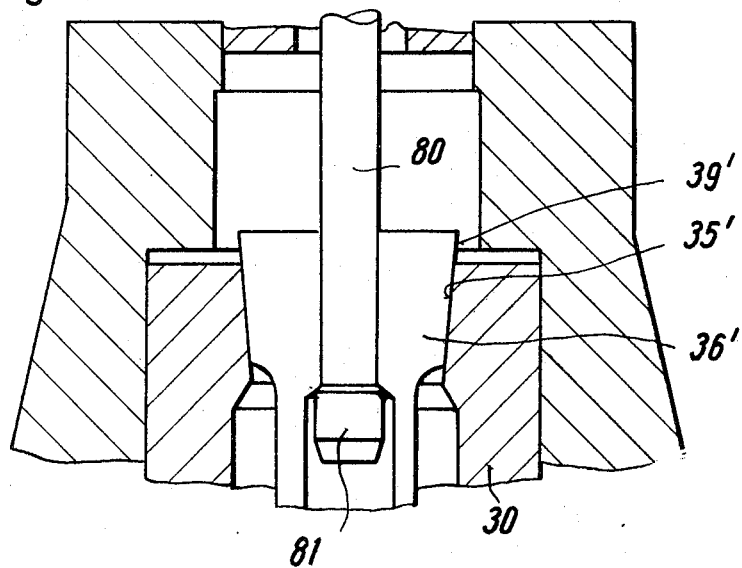
FIG. 5 illustrates a further exemplary embodiment of the invention.

FIG. 5 illustrates one embodiment of the invention which is of an importance if a frictional connection between the draw-in arbor 80 and the collet 36' is not sufficient for a required clamping pressure. In this embodiment, all parts are constructed approximately in the same manner as, for example, in the embodiment of FIGS. 2 and 3. Only the draw-in arbor 80 is constructed differently, namely, it has a small enlargement at its lower end which is enlarged in FIG. 5 and identified with reference numeral 81. It is an advantage of the invention that only a few tenths of a millimeter of a difference in diameter are sufficient to effect a positive connection. Thus, during clamping, the collet 36' falls in behind the enlargement 81 and pulls the arbor 80 downwardly, as above described. Due to the conical surfaces 35', 39' and the urging of same resiliently downwardly, a very tight connection is obtained according to the invention.

In the exemplary embodiments the clamping axis (workpiece axis) is vertically oriented and the workpiece is pulled downwardly onto the support. The invention is not limited to this; but, for example, a horizontal or otherwise directed clamping axis may be provided. It is also possible to press or pull the workpiece against a plate which, for example, is positioned above the workpiece. The invention is also not limited to gear generating machines but can be used on all gear processing machines.

The embodiments of the invention in which an exclusive property or privilege is claimed are defined as follows:
1. A workpiece clamping device, comprising:
   a workpiece support engageable with one end of said workpiece;
   a movable support member and means for moving same toward and away from said workpiece support and engageable with the opposite end of said workpiece;
   a drawbar and means for driving same axially toward and away from said workpiece;
   clamping means on said drawbar for effecting, both an initial and a final clamping coupling of said drawbar with said workpiece to pull said workpiece toward said workpiece support to thereby clamp said workpiece on said workpiece support; and
   means for resiliently yielding to the movement of said drawbar to delay the application of said final clamping coupling of said drawbar with said workpiece to thereby permit an adjusting movement of said workpiece relative to said workpiece support prior to the application of said final clamping coupling.
2. A workpiece clamping device comprising:
   a workpiece support engageable with said workpiece;
   arbor means arranged axially of said workpiece;
   a clamping collet member adapted to engage said arbor means, said clamping collet member having a first conical surface thereon;
   means for causing a relative movement between said arbor means and said clamping collet member;
   a sleeve member having a second conical surface thereon cooperable with said first conical surface to cause said clamping collet member to engage said arbor means, said sleeve member being supported for axial movement relative to said clamping collet member to cause said clamping collet member to first apply an initial clamping pressure on said arbor means when a relative movement occurs between said arbor means and said clamping collet member; and resilient means for causing said sleeve member to resiliently resist the relative movement between said clamping collet member and said arbor means to cause said clamping collet member to apply a final clamping pressure on said arbor means.

3. A workpiece clamping device according to claim 2, including a support member and means for moving same toward and away from said workpiece support; and wherein said arbor means is secured to said support member.

4. A workpiece clamping device according to claim 3, wherein said support member is rotatably secured in a tailstock movable toward and away from said workpiece support.

5. A workpiece clamping device according to claim 2, including means supporting said arbor means for longitudinal movement relative to said workpiece support; and wherein said arbor means is rotatably secured in a tailstock.

6. A workpiece clamping device according to claim 2, wherein said clamping collet member has a plurality of angularly spaced slots extending parallel to the longitudinal axis thereof.

7. A workpiece clamping device according to claim 2, wherein said arbor means includes an enlargement engageable with said clamping collet member to urge said cooperable conical surfaces tightly together to effect a final clamping pressure of said clamping collet member on said arbor means.

8. A workpiece clamping device according to claim 2, wherein said arbor means is an elongated extension of said workpiece; and wherein said clamping collet member is adapted to engage said elongated extension of said workpiece.

9. A workpiece clamping device according to claim 8, including an elongated centering device supported for axial movement relative to said clamping collet member.

10. A workpiece clamping device according to claim 2, wherein said means for causing a relative movement between said arbor means and said clamping collet member is a drawbar drivable axially of said workpiece; and wherein said clamping collet member is connected positively to said drawbar and is movable therewith.

11. A workpiece clamping device according to claim 2, wherein the resilient resistance of said resilient means increases as a function of the relative displacement between said arbor means and said clamping collet member.

12. A workpiece clamping device comprising:

a workpiece support engageable with said workpiece;

arbor means arranged axially of said workpiece and having a first surface portion thereon extending parallel to the axis of said workpiece;

a clamping collet member having a second surface thereon adapted to engage said first surface on said arbor means, said clamping collet member further having a first conical surface thereon;

means for causing a relative movement between said arbor means and said clamping collet member;

a sleeve member having a second conical surface thereon cooperable with said first conical surface to cause said clamping collet member to engage said first surface portion on said arbor means, said sleeve member being supported for axial movement relative to said clamping collet member to cause said clamping collet member to first apply an initial clamping pressure on said first surface portion on said arbor means when a relative movement occurs between said arbor means and said clamping collet member; and resilient means for causing said sleeve member to resiliently resist the relative movement between said clamping collet member and said arbor means to cause said clamping collet member to apply a final clamping pressure on said first surface portion on said arbor means.

* * * * *

UNITED STATES PATENT OFFICE
CERTIFICATE OF CORRECTION

Patent No. 3 664 227　　　　　　　　　Dated May 23, 1972

Inventor(s) Heinrich R. Fischer

It is certified that error appears in the above-identified patent and that said Letters Patent are hereby corrected as shown below:

Page 1; please correct the spelling of the name of the Assignee to "Hurth".

Signed and sealed this 24th day of October 1972.

(SEAL)
Attest:

EDWARD M. FLETCHER, JR.　　　　　　ROBERT GOTTSCHALK
Attesting Officer　　　　　　　　　　Commissioner of Patents